United States Patent
Sato et al.

(10) Patent No.: US 8,014,792 B2
(45) Date of Patent: Sep. 6, 2011

(54) INFORMATION RECEIVING TERMINAL AND INFORMATION DISTRIBUTING SYSTEM

(75) Inventors: Junichi Sato, Tokyo (JP); Takao Yamaguchi, Osaka (JP); Ichiro Takei, Tokyo (JP); Daiji Ido, Tokyo (JP); Yoshifumi Yonemoto, Kanagawa (JP)

(73) Assignee: PANASONIC Corporation, Osaka (JP)

( * ) Notice: Subject to any disclaimer, the term of this patent is extended or adjusted under 35 U.S.C. 154(b) by 749 days.

(21) Appl. No.: 11/573,140

(22) PCT Filed: Aug. 2, 2005

(86) PCT No.: PCT/JP2005/014092
§ 371 (c)(1),
(2), (4) Date: Feb. 2, 2007

(87) PCT Pub. No.: WO2006/013844
PCT Pub. Date: Feb. 9, 2006

(65) Prior Publication Data
US 2007/0249367 A1   Oct. 25, 2007

(30) Foreign Application Priority Data

Aug. 5, 2004   (JP) .................................. 2004-229734

(51) Int. Cl.
*H04W 24/00*   (2009.01)
(52) U.S. Cl. ..................... 455/456.3; 340/988; 701/117; 701/118; 701/119; 701/201; 701/209; 797/104
(58) Field of Classification Search ............. 342/357.09, 342/357.1; 455/456.3; 701/117–201, 209; 797/104
See application file for complete search history.

(56) References Cited

U.S. PATENT DOCUMENTS

| | | | | |
|---|---|---|---|---|
| 5,787,383 A * | 7/1998 | Moroto et al. | ................ | 701/210 |
| 5,911,773 A * | 6/1999 | Mutsuga et al. | .............. | 701/200 |
| 6,208,935 B1 | 3/2001 | Yamada et al. | | |
| 6,243,091 B1 * | 6/2001 | Berstis | ......................... | 715/839 |
| 6,282,493 B1 * | 8/2001 | Kitagawa et al. | ............. | 701/211 |
| 6,320,518 B2 * | 11/2001 | Saeki et al. | .............. | 340/995.12 |
| 6,438,561 B1 * | 8/2002 | Israni et al. | ................ | 707/104.1 |
| 6,523,021 B1 * | 2/2003 | Monberg et al. | ...................... | 1/1 |
| 6,529,143 B2 * | 3/2003 | Mikkola et al. | ............ | 340/995.1 |
| 6,553,310 B1 * | 4/2003 | Lopke | .......................... | 701/213 |
| 6,668,177 B2 * | 12/2003 | Salmimaa et al. | ............ | 455/566 |

(Continued)

FOREIGN PATENT DOCUMENTS

EP   1176840   1/2002

(Continued)

OTHER PUBLICATIONS

English language Abstract of JP 2003-330832.

(Continued)

*Primary Examiner* — Jinsong Hu
*Assistant Examiner* — Qun Shen
(74) *Attorney, Agent, or Firm* — Greenblum Bernstein, P.L.C.

(57) ABSTRACT

A distance between positional information added to contents and a current position detected in an information receiving terminal is calculated, and based on the calculated distance, a method for outputting the contents is controlled. Thus, since the method for outputting the contents can be changed by a positional relationship between the contents and the information receiving terminal, distance relationship between the current position and the contents can be clearly displayed so that users can easily select the contents.

15 Claims, 11 Drawing Sheets

U.S. PATENT DOCUMENTS

| | | | |
|---|---|---|---|
| 6,680,694 B1 * | 1/2004 | Knockeart et al. | 342/357.09 |
| 6,760,770 B1 | 7/2004 | Kageyama | |
| 6,819,268 B2 * | 11/2004 | Wakamatsu et al. | 340/988 |
| 6,868,331 B2 * | 3/2005 | Hanebrink | 701/117 |
| 6,968,179 B1 | 11/2005 | De Vries | |
| 7,096,115 B1 * | 8/2006 | Groth et al. | 701/117 |
| 7,110,880 B2 * | 9/2006 | Breed et al. | 701/207 |
| 7,139,557 B2 * | 11/2006 | Tang et al. | 455/414.2 |
| 7,225,077 B2 * | 5/2007 | Kouchiyama | 701/209 |
| 2002/0049533 A1 * | 4/2002 | Kusano et al. | 701/209 |
| 2002/0152273 A1 | 10/2002 | Pradhan et al. | |
| 2002/0178220 A1 | 11/2002 | Smith et al. | |
| 2004/0172193 A1 * | 9/2004 | Monde et al. | 701/209 |
| 2005/0227676 A1 | 10/2005 | De Vries | |
| 2006/0055565 A1 * | 3/2006 | Kawamata et al. | 340/995.13 |
| 2006/0156360 A1 | 7/2006 | Sato et al. | |
| 2006/0168517 A1 | 7/2006 | Itoh et al. | |
| 2007/0038950 A1 | 2/2007 | Taniguchi et al. | |

FOREIGN PATENT DOCUMENTS

| | | |
|---|---|---|
| JP | 11-316541 | 11/1999 |
| JP | 2000-184431 | 6/2000 |
| JP | 2000-187667 | 7/2000 |
| JP | 2001-134618 | 5/2001 |
| JP | 2001-238266 | 8/2001 |
| JP | 2002-297615 | 10/2002 |
| JP | 2003-330832 | 11/2003 |

OTHER PUBLICATIONS

English language Abstract of JP 2000-187667.
English language Abstract of JP 2002-297615.
English language Abstract of JP 2001-238266.
English language Abstract of JP 2000-184431.
English language Abstract of JP 2001-134618.
Jianting Zhang et al., "A GML-based open architecture for building a geographical information search engine over the internet", Web Information Systems Engineering, 2001, Proceedings of the Second International Conference on, Piscataway, NJ, USA, IEEE, vol. 2, Dec. 3, 2001, pp. 25-32, XP010589419, ISBN: 978-0-7695-1393-5.
Pramudiono et al, "User behavior analysis of location aware search engine", Mobile Data Management, 2002, Proceedings, Third International Conference on Jan. 8-11, 2002, Piscataway, NJ, USA, IEEE, Jan. 8, 2002, pp. 139-145, XP010587797, ISBN: 978-0-7695-1500-7.
Yeh et al., "Searching the web with mobile images for location recognition", Computer Vision and Pattern Recognition, 2004, CVPR 2004, Proceedings of the 2004 IEEE Computer Society Conference on Washington, DC, USA, Jun. 27-Jul. 2, 2004, IEEE Computer Society, Piscataway, NJ, USA, vol. 2, Jun. 27, 2004, pp. 76-81, XP010708647, ISBN: 978-0-7695-2158-9.
Japan Office action, mail date is Mar. 15, 2011.

* cited by examiner

```
401  <?xml version="1.0"?>
402  <Content>
403    <Title>FLOWER SHOP</Title>
404    <Abstract>WE HAVE A WIDE SELECTION OF SEASONAL FLOWERS!</Abstract>
405    <Location>N35.10.10,E135.10.10</Location>
406    <Station>Station 5</Station>
407    <Channel>Channel 3</Channel>
408    <Start>2003/12/20 10:50:00</Start>
409    <End>2003/12/20 10:51:00</End>
410    <Valid_Station>Station 3</Valid_Station>
411    <Valid_Start>2003/12/20 11:00:00</Valid_Start>
412    <Valid_End>2003/12/31 17:00:00</Valid_End>
413    <Category>Flower</Category>
414    <Priority>High</Priority>
415    <arrival unit="minute">0-3</arrival>
416  </Content>
```

FIG. 3

```
601 <?xml version="1.0"?>
602 <Content>
603   <Title>FLOWER SHOP</Title>
604   <Abstract>WE HAVE A WIDE SELECTION OF SEASONAL FLOWERS!</Abstract>
605   <Location>N35.10.10,E135.10.10</Location>
606   <URL>http://www.flowershop.com</URL>
610   <Valid_Station> Station 3</Valid_Station>
611   <Valid_Start>2003/12/20 11:00:00</Valid_Start>
612   <Valid_End>2003/12/31 17:00:00</Valid_End>
613   <Category>Flower</Category>
614   <Priority>High</Priority>
615 </Content>
```

FIG.10

INFORMATION RECEIVING TERMINAL AND INFORMATION DISTRIBUTING SYSTEM

TECHNICAL FIELD

The present invention relates to an information receiving terminal for receiving information and to an information distributing system.

BACKGROUND ART

Conventional information distributing systems distribute different information in accordance with the distance between the current position of a mobile terminal and the position related to the community information, for the purpose of providing community-based information to the mobile terminal (e.g., see Patent Document 1).

This conventional technique registers, in an information transmission server, community information having different transmission regions. The information transmission server calculates the distance between the position information of the mobile terminal and the position information related to the community information when the position information of the mobile terminal is received. The information transmission server transmits to the mobile terminal community information that is in accordance with terminal distance. In other words, the information transmission server transmits community information that corresponds to the position of the mobile terminal.

Patent Document 1: Japanese Laid-open Patent Application No. 2001-238266

DISCLOSURE OF INVENTION

Problems to Be Solved by the Invention

However, the conventional configuration merely randomly displays community information, and the positional relationship of the community information is therefore not made available. In other words, there is a problem in that it cannot be known which community information is most proximate to the current position.

An object of the present invention is to provide an information receiving terminal and information distribution system that allow a user to easily select community information by making distance relationships apparent between the current position and the community information.

Means for Solving the Problem

The present invention calculates a distance between position information added to content and a current position detected inside an information receiving terminal, and controls an output method of the content based on the calculated distance.

Advantageous Effect of the Invention

In accordance with the present invention, the content output method can be varied depending on the positional relationship between the content and the information receiving terminal. The distance relationship between the current position and the content can therefore be clearly displayed, thus allowing the user to select content easily.

BRIEF DESCRIPTION OF DRAWINGS

FIG. 3 is a diagram showing an example of attribute information of content according to Embodiment 1;

FIG. 10 is diagram showing an example of the content information related to the communication content of Embodiment 2.

BEST MODE FOR CARRYING OUT THE INVENTION

Now, embodiments of the present invention will be described below with reference to the diagrams.

Embodiment 1

Figure 1:
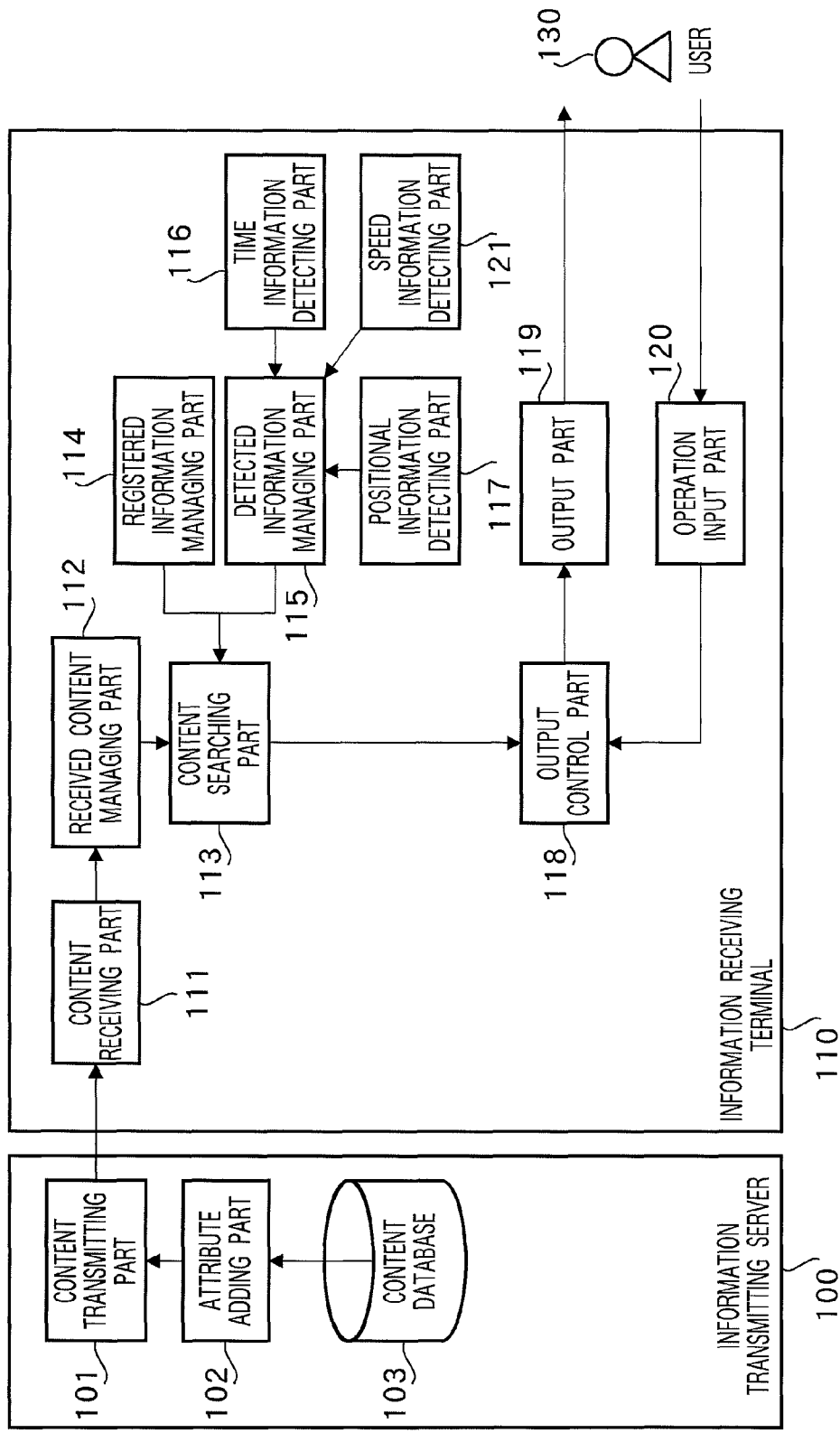
FIG. 1 is a block diagram showing an information distribution system according to Embodiment 1 of the present invention.

The configuration of the information distribution system according to Embodiment 1 of the present invention will be described with reference to FIG. 1. FIG. 1 is a block diagram showing the information distribution system according to Embodiment 1 of the present invention.

In FIG. 1, information transmitting server 100 broadcasts content to information receiving terminal 110. User 130 views and listens to content received by information receiving terminal 110.

Information transmitting server 100 may principally use ground wave broadcasting, satellite broadcasting, wireless LANs, mobile phones, and other radio waves as the broadcasting section, but infrared and other broadcast media may also be used. The broadcast section is not limited to wireless broadcasting, and cable broadcasting that includes the Internet and cable television may be used. The broadcast range may be a wide range having a radius of several tens of kilometers or more, such as in ground wave broadcasting, or a radius of several tens of meters to several kilometers, as shown in FIG. 2.

Figure 2:
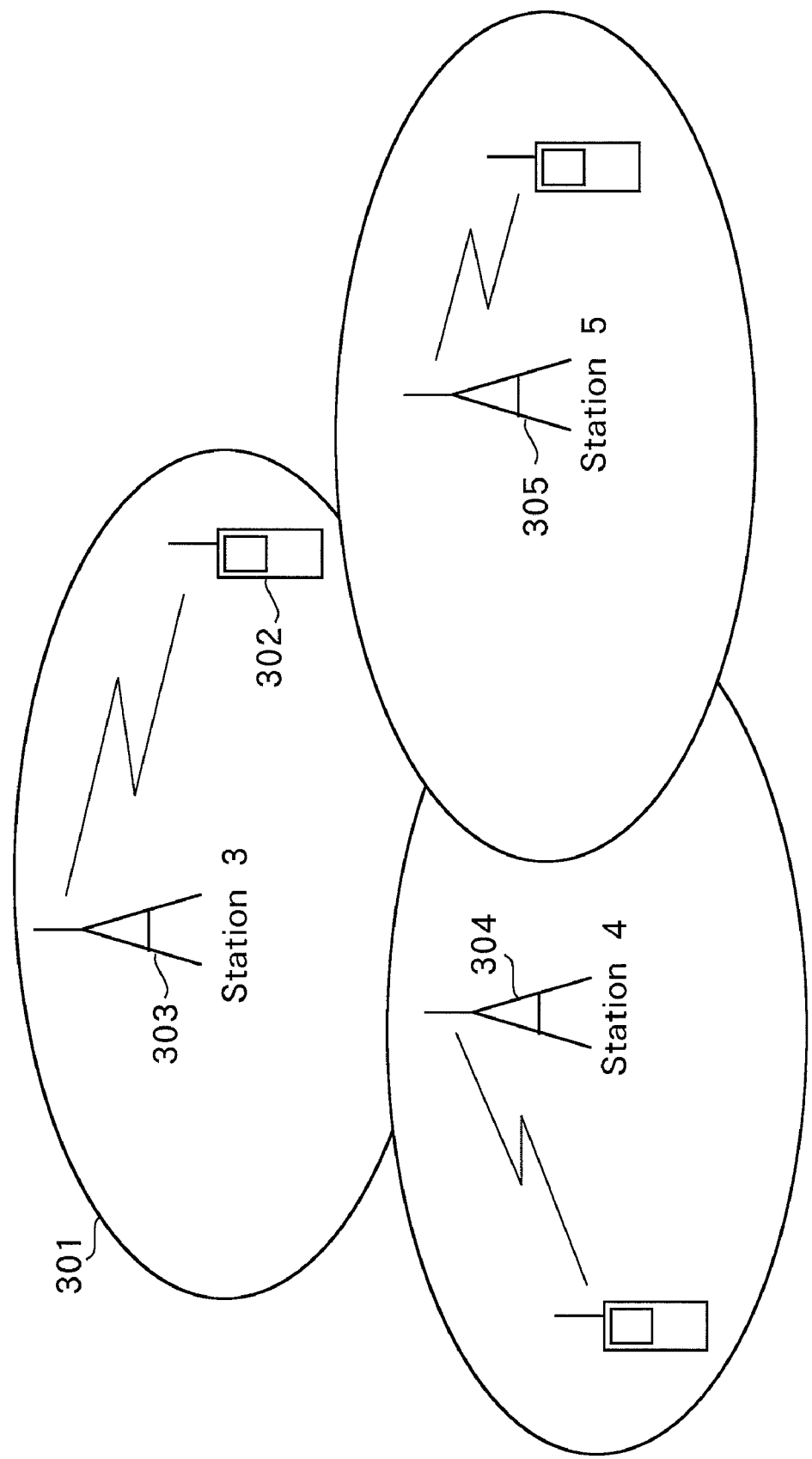
FIG. 2 is a diagram that describes the broadcast mode of Embodiment 1.

Specific examples of the broadcast mode shown in FIG. 2 include mini-FM stations and base stations for mobile phones. In the example of FIG. 2, a plurality of broadcast stations 303 to 305 are present that broadcast content to information receiving terminal 302 in broadcast range 301 having a radius of several tens of meters to several kilometers.

There are cases in which information transmitting server 100 and information receiving terminal 110 are present in the same terminal and carry out processing within the same terminal without sending or receiving content.

The configuration of information transmitting server 100 is described next. Information transmitting server 100 has content database 103 that holds content. Information transmitting server 100 is provided with attribute adding part 102 that adds corresponding attributes to the content held in content database 103. Attribute adding part 102 transmits the content to which attributes have been added to content transmitting part 101, and content transmitting part 101 transmits the content to information receiving terminal 110.

The attributes added by attribute adding part 102 include position information, categories, valid period, priority, broadcast station ID, and estimated time of arrival.

The position information is geographical position information, and includes latitude and longitude values, for example. When the content is store advertising information, tour guide information at tour sites, or other such information, the position information shows the position of the store or tour site.

The categories may show the type of content; classification of content such as "advertising" and "tour sites;" the type of store of the advertising entity, such as "restaurant" or "food market"; or the store name, tour site name, or the like. The categories may be age, gender, occupation, or the like of users at which the content is targeted.

The valid period indicates the date and time that the content is to be shown, and may describe the starting date and time or time, or the ending date and time or time of the valid period.

The priority is the priority for showing the content and may express the level of importance of the content for information transmitting server 100, which is the transmitting machine. The priority may be expressed as "high," "medium," or "low," or may be expressed as a numerical value, with 5 being the highest priority and 1 being the lowest priority, for example. Advertising may be displayed with priority, sightseeing information may be displayed with reduced priority, for example, and different levels of priority for advertising may also be assigned depending on the type of store.

The broadcast station ID is an identifier that can identify broadcast stations that transmit and broadcast stations that display. The identifier can be checked to confirm which broadcast station the content is being sent from (i.e., which broadcast area of the broadcast station corresponding to the current position), and which broadcast area of the broadcast station the content should be displayed for.

The estimated time of arrival shows the time until information receiving terminal 110 arrives at the position of the position information. The content to be displayed is selected depending on the estimated time of arrival.

The above attributes are transmitted as data attached to the content. The ID of the transmitting broadcast station may also be differentiated by the transmitting frequency.

An example of writing the attributes in XML is described next with reference to FIG. 3. XML is an abbreviation of eXtensible Markup Language, and a detailed description thereof can be found on the web page http://www.w3.org. The numbers at the left end of each line in FIG. 3 are line numbers used for description.

Line 401 shows that this text is written in XML. The lines enclosed by line 402 <Content> and line 416 </Content> show the attributes of the content. Line 403 <Title> is the title of the content that shows that the content is advertising for a flower shop. Line 404 <Abstract> shows a summary of the content. Line 405 <Location> shows the geographical position indicating the position of the flower shop, which is the advertising entity. Line 406 <Station> shows the name of the broadcast station that broadcasts the content, and line 407 <Channel> shows the channel which broadcasts the content. The broadcast station name "Station5" shows the broadcast station 5 (305) of FIG. 2.

Line 408 <Start> and 409 <End> express the broadcast start and end times.

When some content are being received via a known broadcast station and channel, lines 406 to 409 may be omitted because the broadcast station, channel, and time span are already known.

Line 410 <Valid_Station> shows the broadcast station name for which the content is valid. The broadcast station name "Station 3" shows the broadcast station 3 (303) of FIG. 2.

Lines 411 <Valid_Start> and 412 <Valid_End> express the start and end times of the valid period in which the content can be displayed. Line 411 may be omitted when the valid period is already in effect in the broadcasting time period.

Line 413 <Category> shows the category of the content, and line 414 <Priority> shows that the level of importance is high.

Line 415 <Arrival unit="minute"> shows the estimated time of arrival, and shows that this content will be selected when arrival is estimated to occur at the noted time. The example in FIG. 3 shows that when arrival is expected to occur within 0 to 3 minutes, the content shown in FIG. 3 will be selected.

The configuration of information receiving terminal 110 is described next with reference to FIG. 1.

Information receiving terminal 110 is provided with content receiving part 111 whereby content and attribute information about the content are received and registered in received content managing part 112 from information transmitting server 100. Received content managing part 112 is a section for registering and managing the content and attribute information about the content.

Information receiving terminal 110 is provided with positional information detecting part 117 for detecting the current position of information receiving terminal 110. GPS (Global Positioning System) may be used as the method for detecting the current position of positional information detecting part 117. Also, ID information that shows the position may be received as the position information by positional information detecting part 117 from the base station of a mobile phone, PHS (Personal Handyphone System), or the like. Positional information detecting part 117 transmits the detected position information to detected information managing part 115, and detected information managing part 115 manages the detected position information.

Information receiving terminal 110 is also provided with time information detecting part 116 that detects the current time. Time information detecting part 116 transmits detected time information to detected information managing part 115, and detected information managing part 115 manages the time information.

Information receiving terminal 110 is also provided with speed information detecting part 121 that detects the movement speed of information receiving terminal 110. Speed information detecting part 121 transmits the detected movement speed to detected information managing part 115, and detected information managing part 115 manages the movement speed. Speed information detecting part 121 is a speedometer or other multipurpose speed detecting section.

Detected information managing part 115 may detect the movement information of information receiving terminal 110 by also using the detected current position information and history information of the current time. For example, the movement distance and the movement direction can be detected by calculating the difference between the previous position information and the current position information.

Speed information detecting part 121 may detect the movement speed by calculating the movement distance and time (difference in time information) required to traverse the movement distance by using the history information of the current time and the current position information detected by detected information managing part 115.

Information receiving terminal 110 is also provided with registered information managing part 114 that registers the preferences or the like of user 130 of information receiving terminal 110.

Information receiving terminal 110 is also provided with content searching part 113 for searching the content to be displayed from the content managed by received content managing part 112. Content searching part 113 searches and displays as the display content the content nearest to the current position of information receiving terminal 110 selected from the advertising, tour sites, and other content related to the position. Content searching part 113 may use as the content search conditions the preferences or other information of user 130 registered in registered information managing part 114.

Information receiving terminal 110 is also provided with output control part 118 for controlling the manner in which the content is displayed using attribute information that includes the distance of the content and the direction in which the content is located. Output control part 118 outputs a display screen, which is the result of controlling the display method, to output part 119, and output part 119 outputs the display screen.

Following are possible examples of the method in which output control part 118 displays content: (1) all of the content, (2) some of the content, (3) a summary of the content, (4) the title of the content, (5) the order of display, and (6) a list display or one-by-one display.

Figure 4:
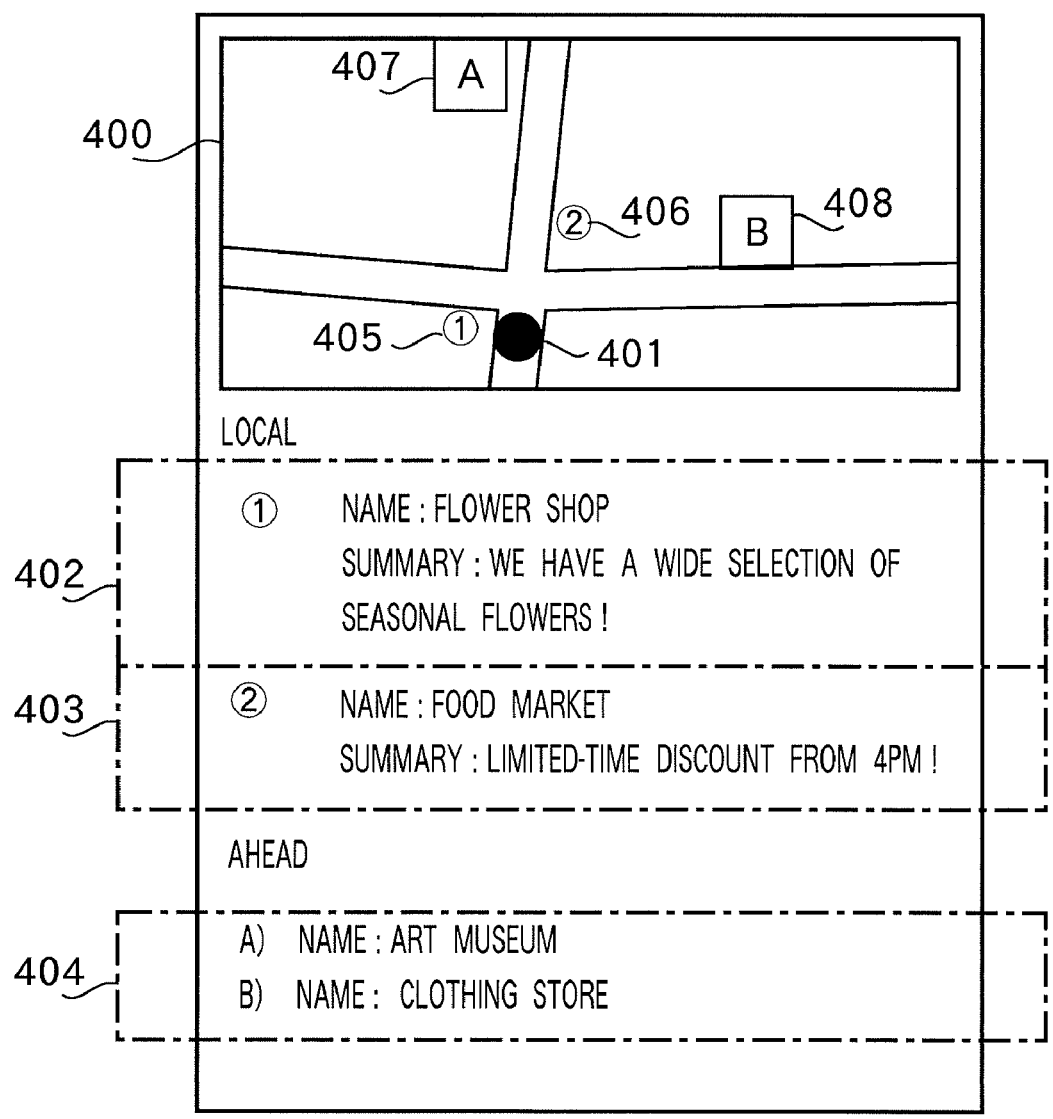
FIG. 4 is a first diagram showing an example of content display of Embodiment 1.

Thus, output control part 118 displays a larger amount of information for content that is closer in distance. An example of the content display carried out by output control part 118 is shown in FIG. 4. FIG. 4 shows an example of the display screen of information receiving terminal 110.

Map 400 of the area around information receiving terminal 110 is disposed in the upper part of display screen 40 shown in FIG. 4. Black dot 401 in map 400 shows the current position of the information receiving terminal, and a geographical point 1 (405), a geographical point 2 (406), a geographical point A (407), and a geographical point B (408) show the positions of stores and facilities.

Advertisements 402 to 404 corresponding to geographical points 405 to 408 are displayed in the lower part of display screen 40 in the order of proximate distance to information receiving terminal 401.

User 130 can thereby see from the display order the positional relationship between user 130 and each content (advertising).

Since geographical point 1 (405) and geographical point 2 (406) are proximate to information receiving terminal 401, the names and summaries are displayed in advertisements 402 and 403, respectively. On the other hand, geographical point A (407) and geographical point B (408) are at a distance from information receiving terminal 401, and only the names are therefore displayed in each advertisement 404.

Figure 5:
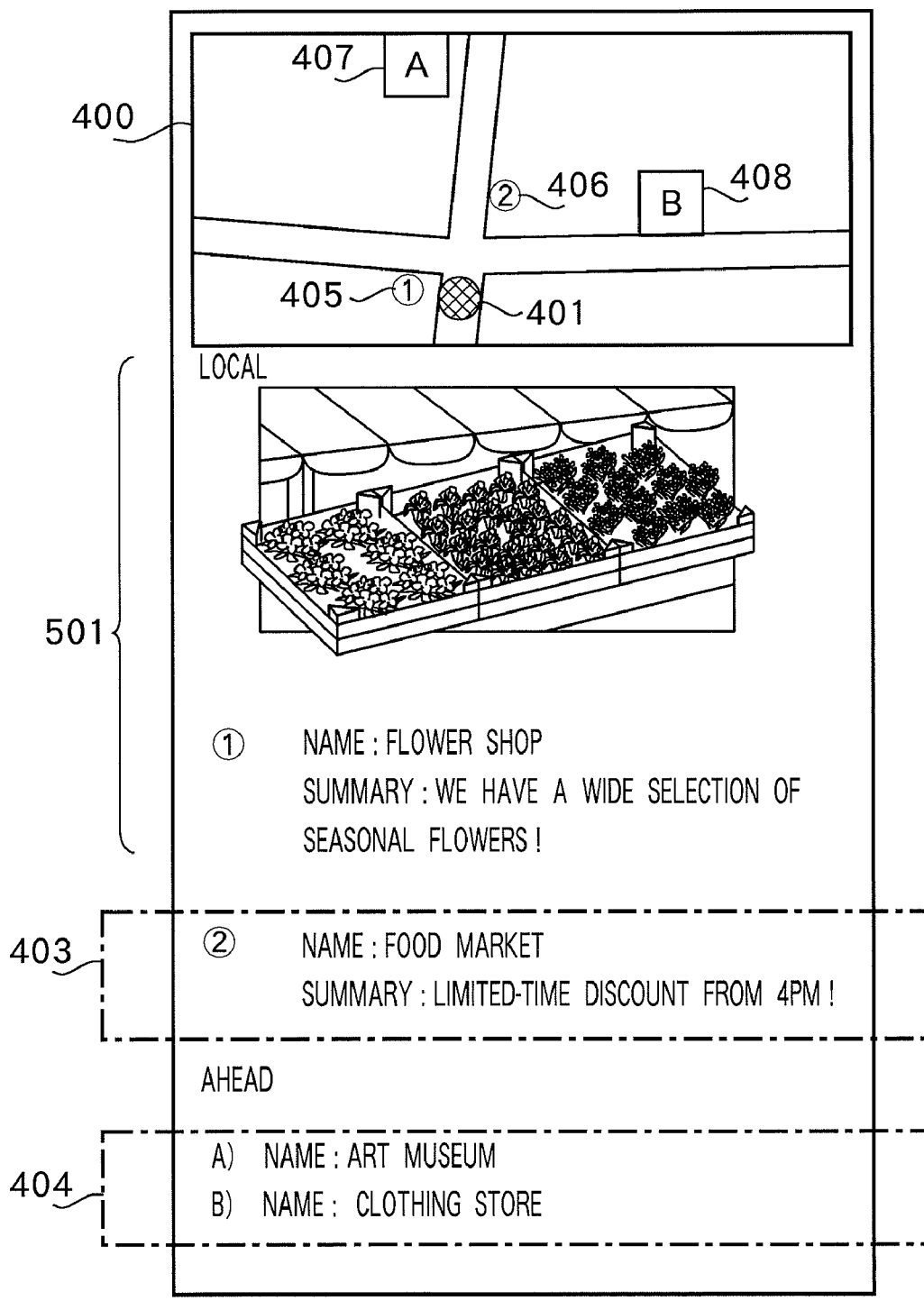
FIG. 5 is a second diagram showing an example of content display of Embodiment 1.

Advertisements 402 to 404 are displayed as a list in order of proximity from information receiving terminal 401. All of the corresponding content may be displayed as advertisement 501 of geographical point 1 (405) that is proximate to information receiving terminal 401, as shown in display screen 500 in FIG. 5. In the case of display screen 500, the name and summary are displayed in the same manner as display screen 400 shown in FIG. 4 for advertisement (403) related to geographical point 2 (406), which is second nearest from information receiving terminal 401. Only some of the corresponding content (still pictures, digest images, or the like) may be displayed for advertisement (403) related geographical point 2 (406) that is second nearest from information receiving terminal 401.

Thus, output control part 118 controls the method of displaying advertising, such as displaying a larger amount of information for content more proximate in distance to information receiving terminal 401. User 130 can thereby ascertain the positional relationship between the content based on the method for displaying advertising. User 130 can obtain a larger amount of information with respect to local content, i.e., highly required content.

Output control part 118 may not only change the order of the content to be displayed, but may also vary the display method of the content in accordance with the distance determined in advance. For example, the display method may be varied so that all of the content in which the distance to information receiving terminal 401 is within 500 m or less are displayed, some of the content in which the distance is between 500 m and 1 km are displayed, the name and summary of the content in which the distance is in a range of 1 to 3 km are displayed, and only the name is displayed for content in a range of 3 to 5 km.

Output part 119 is a monitor or another display device. Other than outputting a display, output part 119 may output audio, for example.

Information receiving terminal 110 is also provided with operation input part 120. Operation input part 120 is a part for inputting information related to operation in which user 130 who has viewed the display of output part 119 selects desired content and changes the display method.

Figure 6:
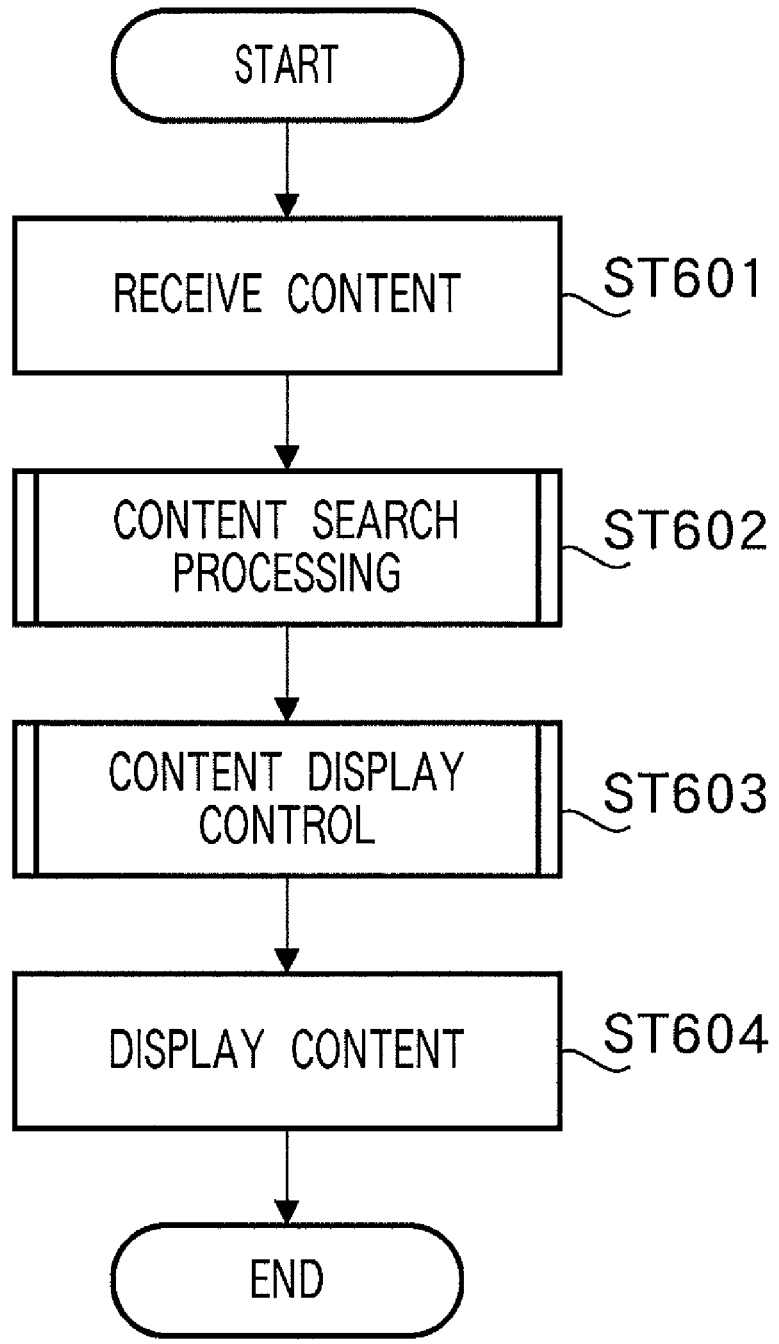
FIG. 6 is a flowchart of the content display processing of the information receiving terminal of Embodiment 1.

The content display processing of information receiving terminal 110 is described in detail next with reference to FIG. 6. FIG. 6 is a flowchart of the content display processing of information receiving terminal 110 of Embodiment 1.

First, content receiving part 111 in information receiving terminal 110 receives content transmitted from information transmitting server 100 (ST601).

Content searching part 113 in information receiving terminal 110 searches (ST602) the content that corresponds to the current position from the content received in ST601. The processing of ST602 is described in detail later.

Next, output control part 118 in information receiving terminal 110 selects the display method that corresponds to the distance to the content searched in ST602, and outputs to output part 119 the content formatted to the selected display method (ST603). Output part 119 then displays the received content (ST604). The details of the processing of ST603 are described later.

Figure 7:
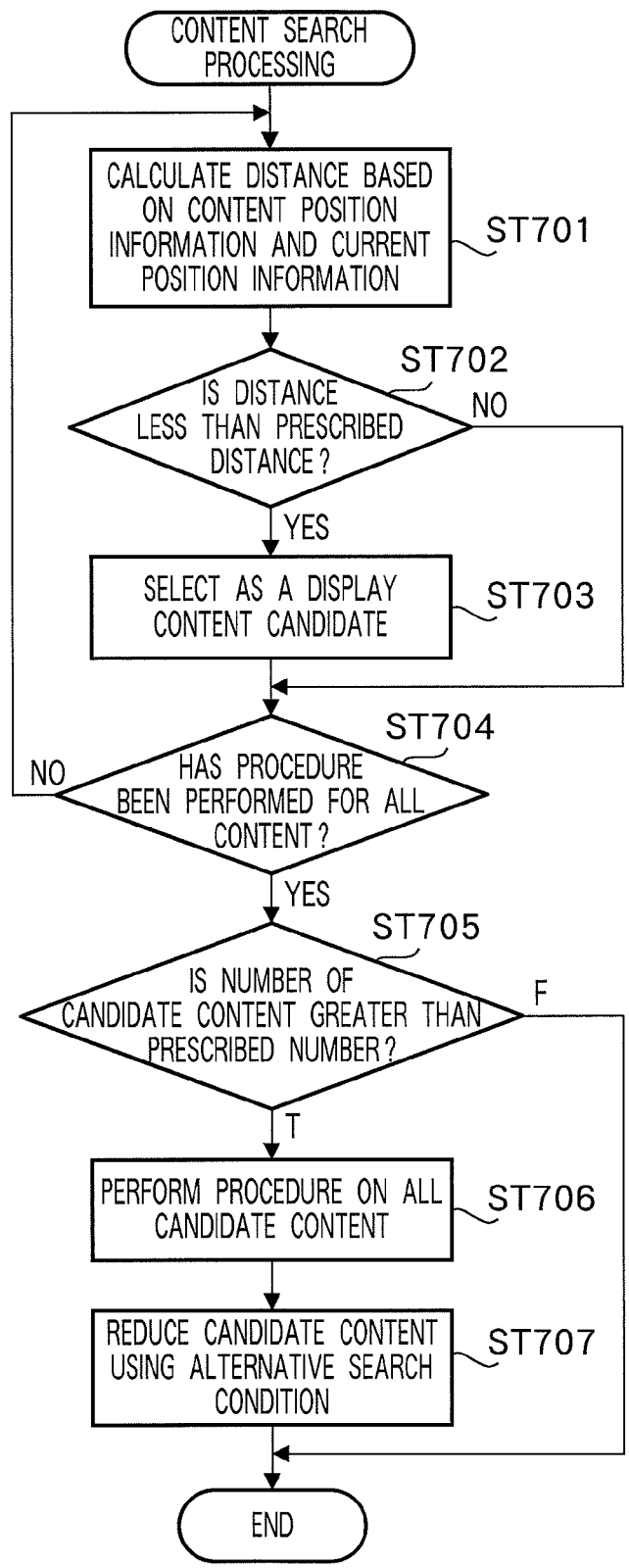
FIG. 7 is a flowchart of the content search processing of the content searching part of Embodiment 1.

The processing of the content search processing (ST602) of content searching part 113 is subsequently described in detail with reference to FIG. 7.

Content searching part 113 calculates the distance based on the position information of the added attribute information and the current position information managed by detected information managing part 115. The calculation is performed with respect to the content being managed in received content managing part 112 (ST701).

If the distance calculated in ST701 is less than a prescribed distance, content searching part 113 determines the content to be nearby (ST702) and sets the content as a display content candidate (ST703). If the distance calculated in ST701 is greater than a prescribed distance, content searching part 113 removes the content from the display content candidates.

Content searching part 113 executes the processing of ST701 to ST703 for all content being managed in received content managing part 112 (ST704), and determines the display content candidates.

The prescribed distance may be always a constant value, or may be varied in accordance with the movement speed of information receiving terminal 110. The content in a range that corresponds to the movement speed can be selected by setting the predetermined distances to be short distances when the movement speed is low, and setting the predetermined distances to be long distances when the movement speed is high.

Instead of distance, content searching part 113 may search content by the estimated time of arrival. In such a case, content searching part 113 calculates the estimated time of arrival from the current position to the position related to the content with respect to the content managed by received content managing part 112. The calculation is made based on the position information of the attribute information added to the content, and based on the speed information and current position information managed by detected information managing part 115. In content searching part 113, the content to which the estimated time of arrival (line 415 of FIG. 3) commensurate with the calculated time has been added is assumed to be a display content candidate. Content searching part 113 also calculates the estimated time of arrival by using the following formula.

(Estimated time of arrival)=(Distance from the current position to the position related to the content)÷(Speed information)

Content searching part 113 subsequently determines whether the number of display content candidates searched in ST704 is greater than a prescribed number (ST705). If the number is greater, the procedure is performed for all of the candidate content (ST706) and the number of candidate content is reduced using other search conditions (ST707).

In ST705, on the other hand, content searching part 113 ends the content searching processing when the number of display content candidates is less than a predetermined number.

The direction in which the content is located, valid period of the content, priority, category, and other parameters are other examples of search conditions that may be used for searching the content.

The direction in which the content is located can be obtained from the angle θ between the direction in which the content is located and the movement direction using the following formula:

Cos θ=(Scalar product of the movement vector and content vector)/((Magnitude of the movement vector)×(Magnitude of the content vector))

In the formula, the movement vector is the vector from an earlier position to the current position, and the content vector is the vector from the current position to the content position.

The location of the content can thereby be calculated with respect to the movement direction. Specifically, since the location of content can be known to be in the forward or rearward direction with respect to the movement of information receiving terminal 110, the content in the forward direction (increasing in proximity) can be selected.

With the valid period of content, it is possible to select content in which the current time is within a valid period, or to perform a selection that includes previous content that is scheduled before the valid period. Content that will subsequently be valid can thereby be displayed in advance.

Content that the transmitting entity deems to be important can be selected with priority by selecting content based on priority.

The category may be used as a search condition in which the preferences or the like of user 130 of information receiving terminal 110 are registered in registered information managing part 114, for example. Information related to flowers (information about florists, for example) can thereby be selected for a user who likes flowers. The search conditions of detected information managing part 115 may be substituted for time information, for example. When the current time is 12:30 PM, for example, the category "restaurants" is generated as a category because the current time falls within the time period for lunch. Restaurant information can be selected at lunchtime by using the category in the search.

The search processing in ST706 may perform the search by using search keys in a sequential fashion until a prescribed number of searches is reached, or by initially using a plurality of search keys. In the above description, searching was initially carried out based on distance, but another search key may initially be used. The distance calculated with respect to the content, and the direction in which the content is located, are added as attributes to the content for use in later processing.

Content searching part 113 has a plurality of prioritized search keys, and the search keys may be used in order of the highest priority to search the content until a prescribed number of search results is reached. Content having attributes that is searched using a high-priority search key can thereby be selected based on priority, and the number of content to be displayed can be limited.

Thus, content searching part 113 searches content to be displayed from position information detected by position information detecting part 117 and managed by detected information managing part 115, and from the content stored and managed by registered information managing part 114 based on attributes information added to the content.

Next, the processing for content display control (ST603) of output control part 118 is described in detail with reference to FIG. 8.

First, in the content search processing (ST602) of FIG. 6, output control part 118 sorts the searched content to be displayed in the order of the shortest distance between the current position information managed by detected information managing part 115 and the position information of the attribute information added to content to be displayed (ST801).

In ST801, output control part 118 may also sort the content to be displayed in the order of the longest distance.

In ST801, output control part 118 may use the relationship to the movement direction, movement speed, and the distance to sort the content to be displayed, rather than simply using the distance alone. For example, output control part 118 may determine that content in the forward movement direction is nearest even if the distance is somewhat far, and may determine that content rearward of the movement direction to be far even if the distance is short. It is thereby possible to determine the sense of distance in relation to the movement direction. In other words, content corresponding to positions being approached can be determined to be near, and content corresponding to positions increasing in distance can be determined to be far away.

In ST801, output control part 118 may sort content in the order of the estimated time of arrival. In this manner, the content is sorted in the order of the estimated time of arrival rather than the actual distance, whereby the content can be arranged in an order thought to soon become valid by moving at the current movement speed.

Next, output control part 118 determines whether the distance, which is selected from the distances sorted in ST801, between the current position information managed by detected information managing part 115 and the position information of the attribute information added to the most proximately located content is a prescribed distance or less. Output control part 118 determines that the corresponding content is local content when this distance is a prescribed distance or less (ST802).

Next, output control part 118 selects the method of displaying local content for content that is nearby (ST803), and selects (ST804) the method of displaying non-local content for content that is distant (not local).

For example, control is performed so that all of the content are displayed for local content, and the name, summary, or other portions of the content are displayed for non-local content.

Output control part 118 can thereby control the method of displaying advertising in which a larger amount of information is displayed as the location of the content becomes more proximate. As a result, user 130 can ascertain the positional relationship between user 130 and the content based on the method for displaying advertising. User 130 can also obtain a greater amount of information with respect to local content, i.e., highly required content.

Figure 8:
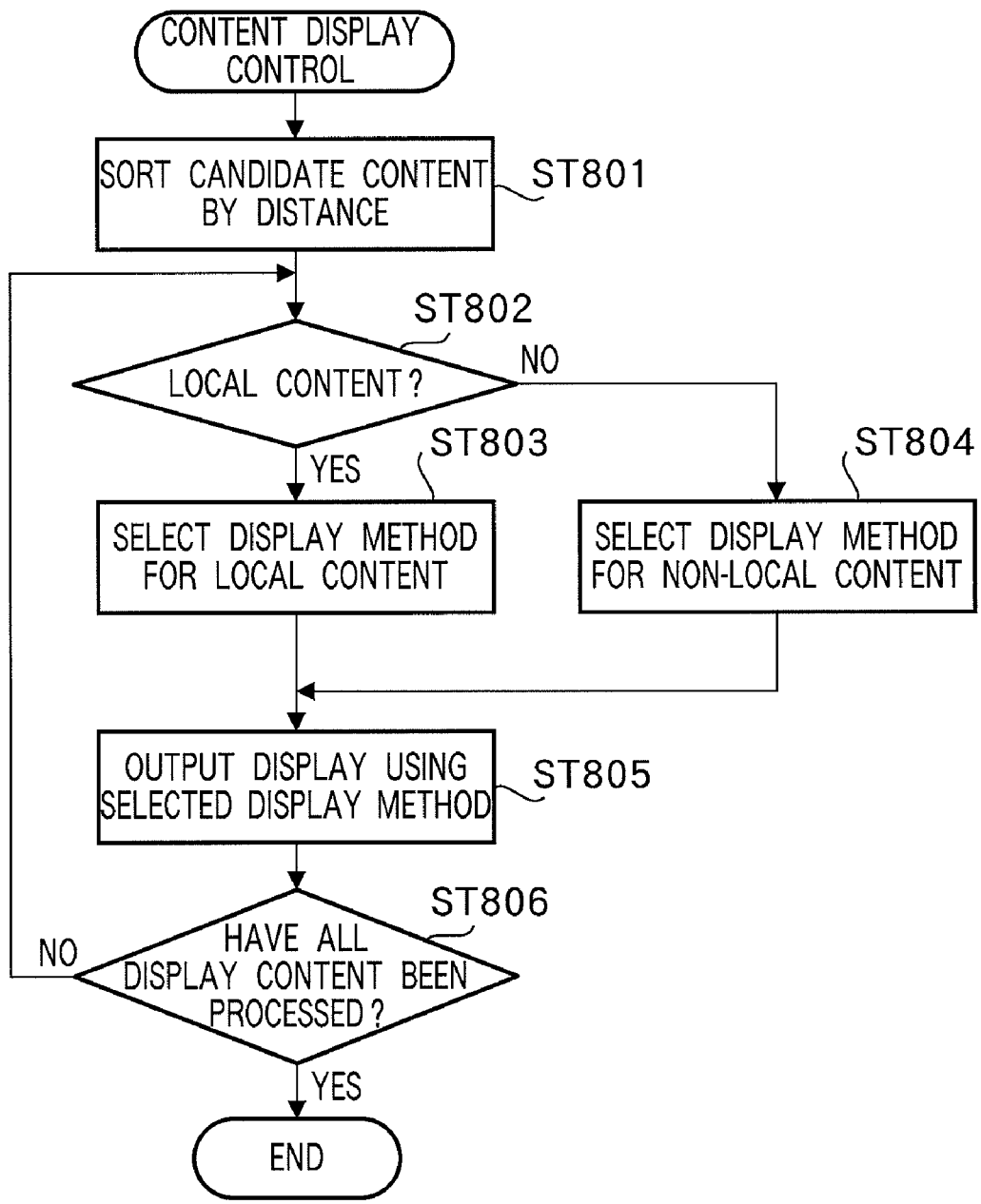
FIG. 8 is a flowchart of the content display control of the output control part of Embodiment 1.

In the flow of FIG. 8, control is performed to display the content in two steps, i.e., display for local content and non-local content. However, the display method of the content may entail more than two steps in accordance with prescribed distances. For example, output control part 118 can vary the display method so that all of the content are displayed if the content are located within a distance of 500 m or less, some of the content are displayed if the content is located at a distance between 500 m and 1 km, the name and summary are displayed if the content is located in a range of 1 to 3 km, and only the name is displayed for content in a range of 3 to 5 km. The user 130 can thereby view the distance from the location of the content in greater detail.

The display method may also be controlled in accordance with the estimated time of arrival to the position added to the content, rather than the content display method being controlled in accordance with the distance between the current position and the position information added to the content. Specifically, rather than displaying a greater amount of information for content that is more proximate, a greater amount of information can be displayed for content for which the estimated time of arrival is shorter. A greater amount of information is thereby displayed for content that is thought to become valid sooner. As a result, the user can obtain a greater amount of information for content that is thought to soon become valid by moving at the current movement speed.

Output control part 118 subsequently generates a display screen using the display method selected in ST803 or ST804, and outputs the display screen to output part 119 (ST805).

Output control part 118 then executes ST802 to ST805 for all the display content in order from the shortest distance to the longest distance of the display content sorted in ST801 (ST806), and ends the processing.

In this manner, output control part 118 arranges and outputs the content to be displayed in the order of the shortest distance to information receiving terminal 110, whereby user 130 can visually confirm the positional relationship between user 130 and the display content.

Output control part 118 controls different displays of the content to be displayed in accordance with the distance to information receiving terminal 110, whereby user 130 can ascertain from the display method the distance to the display content. User 130 can be presented with a greater amount of information for highly required content by increasing the amount of displayed information for more proximate display content.

As described above, in accordance with Embodiment 1, the manner in which the content is presented can be varied in accordance with the positional relationship between the content and the information receiving terminal. The display can thereby be arranged so that the distance relationship between the current position and the content can be made clear, and the user can therefore easily select the content. Also, in information receiving terminal 110, since the manner in which the content is output is changed, the output of the content can be changed in the event that broadcast content is received.

User 130 may view the title and summary of the content and select the content using the output screen of output part 119, and may view and hear all of the content.

In Embodiment 1, a mode was described in which the display method varied in accordance with the distance to the content, but it is also possible to vary the audio output or the like in accordance with the distance to the content.

In Embodiment 1, a mode was described in which the display of the content is switched in accordance with whether the distance from information receiving terminal 110 is closer than a prescribed distance, but also possible is a mode in which the display method of the content is varied by a prescribed number in order from the nearest distance from information receiving terminal 110. In such a case, the prescribed number is preferably varied in accordance with the amount of display information of output part 119.

The transmitting part may add levels of priority to the content, and information receiving terminal 110 may change the display order and amount of the content to which a high priority has been added. Content with a high priority can thereby be displayed with high priority.

Output control part 118 may control the output method of the content based on the broadcast station ID that differentiates between broadcast stations. Content received in areas that are not in the broadcast area for which the display is intended can thereby be displayed immediately when the user has moved into the area for which the display is intended.

Two screens may be used when the content is displayed. For example, the display may be divided into two screens, i.e., a display screen in the front of the car and a display screen in the rear. In this case, content that is very near to the current position is not displayed on the display screen in the rear. The driver can thereby be prevented from suddenly turning the steering wheel or acting in another dangerous manner when people who have viewed content in the immediate vicinity on the display screen in the rear indicate to the driver the desire to see the content located in the immediate vicinity.

Embodiment 2

Figure 9:
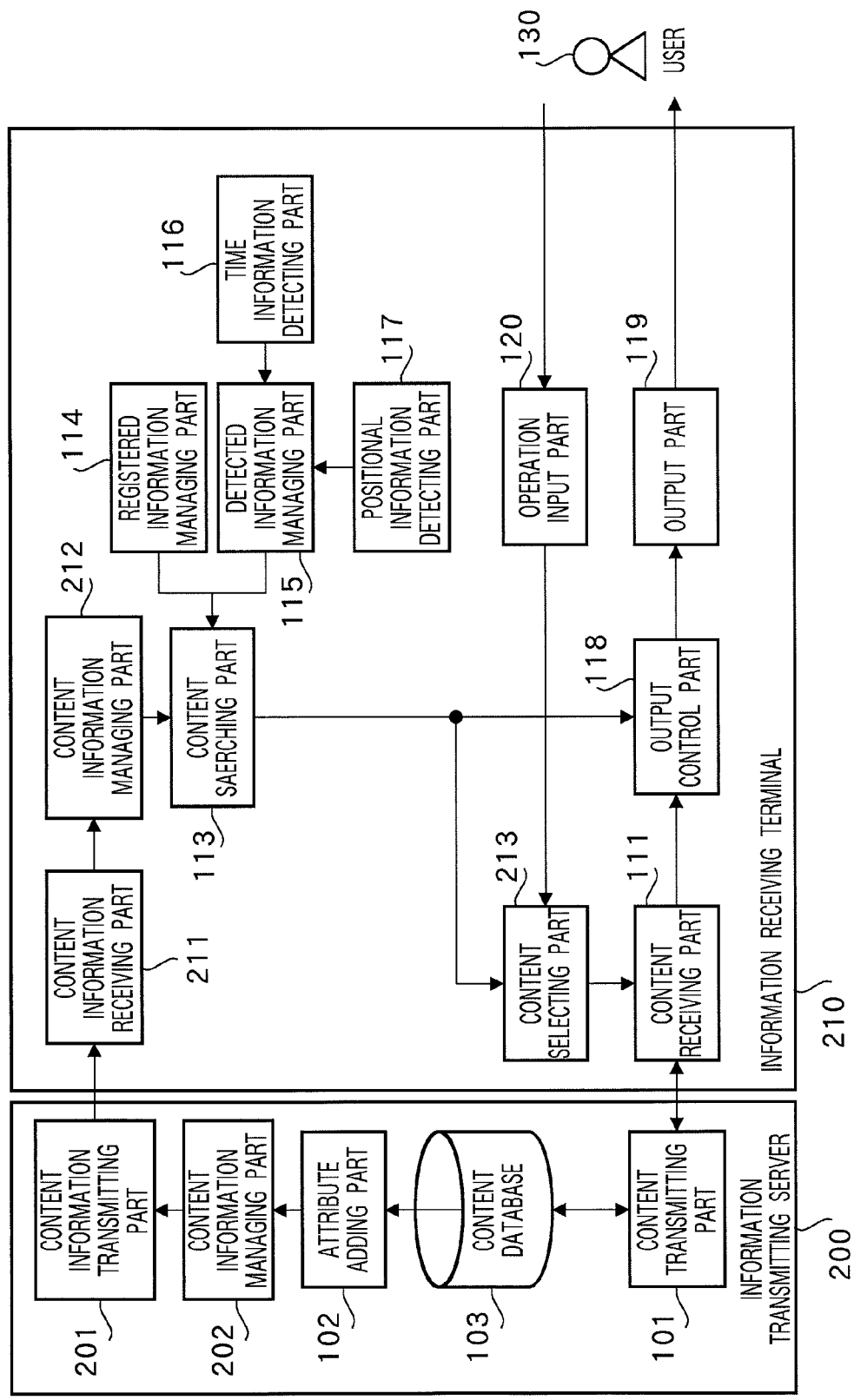
FIG. 9 is a block diagram of an information distribution system of Embodiment 2.

The information distribution system of Embodiment 2 of the present invention is described next. FIG. 9 is a block diagram of the information distribution system of Embodiment 2. In FIG. 9, the same reference numerals are used for the same constituent elements as FIG. 1, and a description thereof is omitted.

The difference between the information distribution system of Embodiment 2 and the information distribution system of Embodiment 1 is that in Embodiment 1, information transmitting server 100 broadcasts and distributes content accompanied by attribute information. In contrast, in Embodiment 2, information transmitting server 200 broadcasts only the attribute information of the content, and the content as such is received by separate transmission based on the attribute information.

The information distribution system of Embodiment 2 is described in detail below.

Attribute adding part 102 in information transmitting server 200 adds attributes to content managed by content database 103, and generates content information. Content information managing part 202 subsequently manages the content information generated by attribute adding part 102. Content information transmitting part 201 then broadcasts the content information managed by content information managing part 202, and information receiving terminal 210 receives the broadcasted content information.

Information receiving terminal 210 receives, in content information receiving part 211, the content information transmitted from information transmitting server 200, and stores and manages the content information in content information managing part 212. At this point, the content as such is not included in the content information received, stored, and managed by information receiving terminal 210.

Next, content searching part 113 searches the content information managed by content information managing part 212 in the same manner as described in relation to Embodiment 1.

Output control part 118 next controls the title, summary, and other outputs and outputs those to output part 119 in the same manner as Embodiment 1 in accordance with the search results.

However, the search results of content searching part 113 are only content information and do not include the content as such. Accordingly, in relation to the content in which all or a part of the content as such are to be displayed, content selecting part 213 selects the content to be displayed, content receiving part 111 receives the content based on a description of the content information, and output control part 118 controls the outputs.

Content receiving part 111 may receive the broadcast based on a specified broadcast station, channel, and broadcast time, or may acquire the broadcast by communication based on a specified server and file name.

An example of the content information related to the broadcast content is shown in FIG. 3. When information receiving terminal 210 displays the content themselves in accordance with distance conditions, content receiving part 111 can receive the content based on the broadcast station described in line 406 <Station>, the broadcast channel described in line 407 <Channel>, the broadcast start time described in line 408 <Start>, and the broadcast end time described in line 409 <End>.

An example of the content information related to the communication content is shown in FIG. 10. The communication content shown in FIG. 10 differs from the broadcast content shown in FIG. 4 in that line 606 is used in place of lines 406 to 409.

When information receiving terminal 210 will display the content themselves in accordance with distance conditions, content receiving part 111 transmits to the server a content transmission request based on the address described in line 606 <URL> and acquires the content. FTP and HTTP are typical protocols used for acquiring content.

As described above, in accordance with Embodiment 2, information receiving terminal 210 can select the content information to be displayed based on the attribute information of the content, which includes the distance to the content; separately acquire the content as such of the selected content information; and display the acquired content using a display method that corresponds to distance.

In accordance with Embodiment 2, information transmitting server 200 broadcasts only the attribute information of the content, and the content themselves can be received by separate communication based on the attribute information. Information receiving terminal 210 can thereby receive by communication only the content required for display in accordance with the distance, and the broadcast transmission bandwidth can be reduced.

User 130 can be allowed to refer to the output of output part 119 and to select content that refers to details. Content selecting part 213 may extract the attribute information of the selected content, and content receiving part 111 may receive and output the content.

Figure 11:
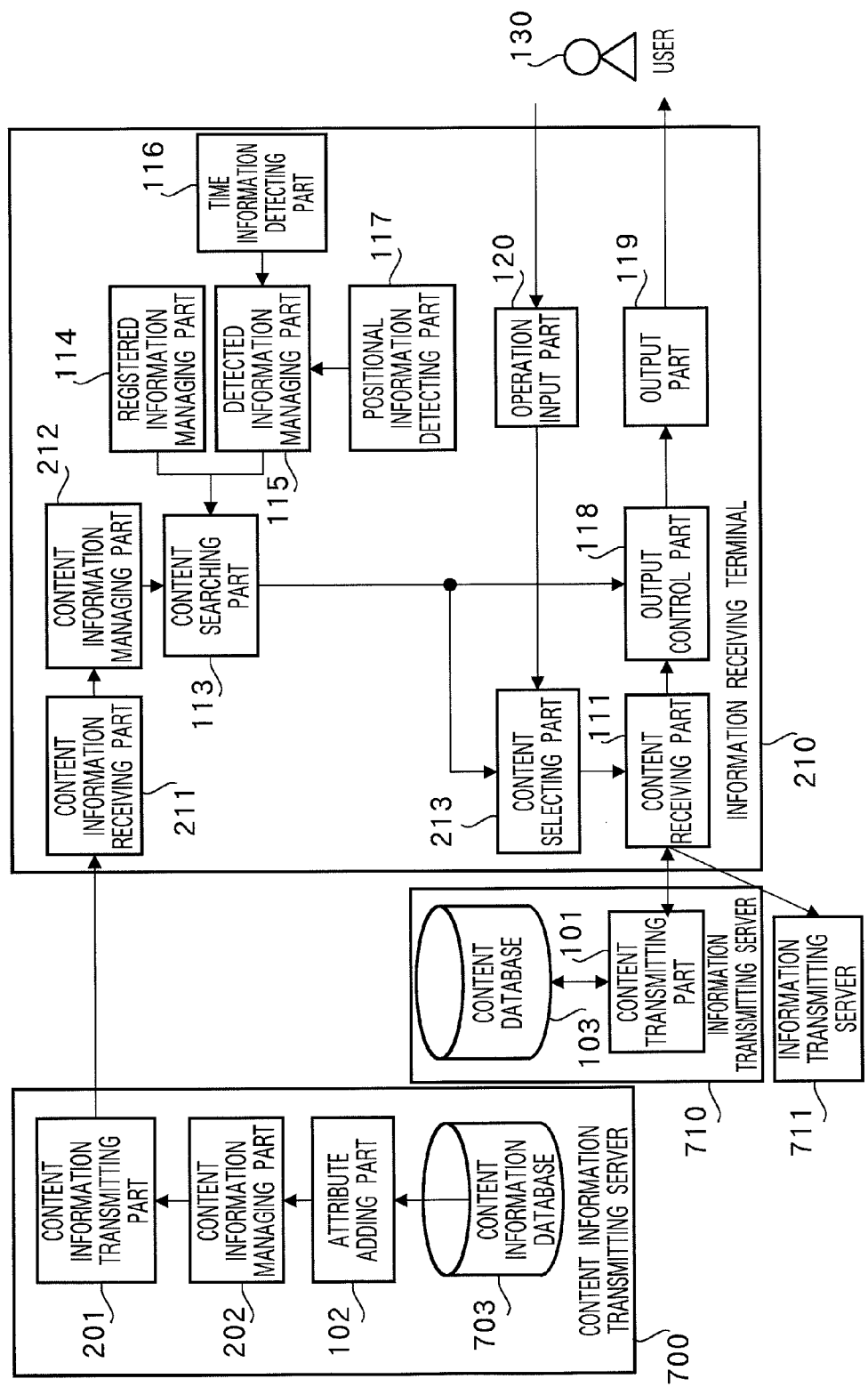
FIG. 11 is a diagram showing another configuration of the information distribution system according to Embodiment 2 of the present invention.

In Embodiment 2, a mode was described in which information transmitting server 200 has both content information transmitting part 201 and content transmitting part 101, but a mode may be used in which separate transmitting servers have content information transmitting part 201 and content transmitting part 101, as shown in FIG. 11.

In the example of FIG. 11, content information transmitting server 700 transmits content information from content information database 703, which stores the content information, to information receiving terminal 210 by way of attribute adding part 102, content information managing part 202, and content information transmitting part 201.

Information transmitting server 710 transmits the content from content database 103, which stores only the content as such, to information receiving terminal 210 via content transmitting part 101. A plurality of information transmitting servers 710 and 711 is present in the example of FIG. 11.

The present specification is based on Japanese Patent Application No. 2004-229734, filed on Aug. 5, 2004, the entire content of which is incorporated herein by reference.

INDUSTRIAL APPLICABILITY

The information receiving terminal and information distribution system of the present invention can vary the manner in which content containing community information is displayed in accordance with the distance from the information receiving terminal, and are suitable for use as mobile phones, on-board terminals, and other mobile terminals.

The invention claimed is:

1. An information receiving terminal comprising:
   a positional information detector that detects current position information;
   a speed information detector that detects movement speed;
   a content searcher that searches content related to facilities and corresponding to the detected current position information, based on the detected current position information, and position information of the content to which attribute information including the position information is added or based on the movement speed detected by the speed information detector; and
   an output controller that controls an output method of the searched content, based on a distance between the position information of the searched content and the current position information, when the content searcher searches based upon the position information or based upon an estimated time of arrival at the position information of the searched content from the current position information, when the content searcher searches based upon the detected movement speed, wherein the estimated time of arrival is based on the detected movement speed;

wherein the output controller varies the output method of the searched content in accordance with an update of the distance, such that the information regarding a facility output from the same searched content related to a previously indicated facility at a smaller distance from the information receiving terminal is more detailed than the information regarding an other facility output from the searched content related to the other facility at a larger distance from the information receiving terminal, when the content searcher searches based upon the position information, or wherein the output controller varies the output method of the searched content in accordance with an update of the estimated time of arrival such that the information regarding a facility output from the same searched content related to the previously indicated facility having a shorter estimated time of arrival is more detailed than the information regarding an other facility output from searched content related to the other facility having a longer estimated time of arrival from the information receiving terminal, when the content searcher searches based upon the detected movement speed.

2. The information receiving terminal according to claim 1, wherein the output controller changes the output method of the searched content at each prescribed value of the distance.

3. The information receiving terminal according to claim 1, wherein: the attribute information comprises output priority information; and the content searcher searches the content based on the output priority information.

4. The information receiving terminal according to claim 1, wherein: the attribute information comprises output priority information; and the output controller controls the output method of the searched content based on the output priority information.

5. The information receiving terminal according to claim 1, wherein the content searcher has a plurality of prioritized search keys and searches the content in order of high-priority search keys to reach a prescribed number of search results.

6. The information receiving terminal according to claim 1, wherein: the attribute information comprises a broadcast station ID for differentiating between broadcast stations; and the output controller controls the output method of the searched content based on information that differentiates between the broadcast stations.

7. The information receiving terminal according to claim 1, wherein the control of the output method comprises a control of a display method.

8. The information receiving terminal according to claim 1, wherein the output controller changes the output method of the content at each prescribed value of the estimated time of arrival.

9. An information distribution system comprising: an information transmitting server comprising: a content storage that stores content; an attribute information manager that manages attribute information including position information to be added to the content; and a content transmitter that adds the attribute information to the content and transmits the content to which the attribute information is added; and the information receiving terminal according to claim 1, wherein the information receiving terminal receives the content to which the attribute information is added, transmitted from the information transmitting server.

10. The information receiving terminal according to claim 1, wherein the output controller outputs all information included in the searched content at the smaller distance, and outputs a portion of information included in the searched content at the larger distance.

11. The information receiving terminal according to claim 1, wherein the output controller outputs the information output from the searched content related to the facility at the smaller distance and the information output from the searched content related to the other facility at the larger distance at a same time.

12. The information receiving terminal according to claim 1, wherein the content searcher searches content having a distance between the position information of the searched content and the current position information that is less than a first predetermined value, and the output controller outputs more information in the searched content having the distance less than a second predetermined value, and outputs less information in the searched content having the distance greater than the second predetermined value, the first predetermined value being greater than the second predetermined value.

13. The information receiving terminal according to claim 1, wherein said output controller further displays the searched content on a display such that the information related to the facility at the smaller distance utilizes a greater portion of a display area of the display than information related to the other facility at the larger distance.

14. An information receiving terminal comprising:

a content information manager that stores and manages content information that comprises attribute information including address and position information of content related to facilities;

a positional information detector that detects current position information;

a speed information detector that detects movement speed;

a content information searcher that searches the content information based on the detected current position information and the position information of the content, or based upon the movement speed detected by the speed information detector;

a content receiving controller that receives the content related to the searched content information, based on a distance between the position information included in the searched content information and the current position information, when the content information searcher searches based upon the position information or based upon an estimated time of arrival at the position information of the searched content from the current position information, when the content information searcher searches based upon the detected movement speed, wherein the estimated time of arrival is based on the detected movement speed; and an output controller that varies an output method of at least one of the searched content information and the content related to the searched content information based on the distance, such that more detailed information regarding a facility is output from the same searched content information and content related to the searched content information related to a previously indicated facility at a smaller distance from the information receiving terminal, and less detailed information regarding an other facility is output from the same searched content information and content related to the searched content information related to the other facility at a larger distance from the information receiving terminal, when the content information searcher searches based upon the position information, or wherein the output controller varies the output method based upon the estimated time of arrival such that the information regarding a facility output from the same searched content related to the previously indicated facility having a shorter estimated time of arrival is more detailed than the information regarding an other facility output from the same searched content related to the other facility at a longer estimated time of arrival from the information receiving terminal, when the content information searcher searches based upon the detected movement speed.

15. The information receiving terminal according to claim 14, wherein said output controller further displays at least one of the searched content information and content related to the searched content information on a display such that the information related to the facility at the smaller distance utilizes a greater portion of a display area of the display than information related to the other facility at the larger distance.

* * * * *